March 12, 1940.  C. A. CHAYNE ET AL  2,193,223
HORN BUTTON
Filed Sept. 18, 1937  2 Sheets-Sheet 1
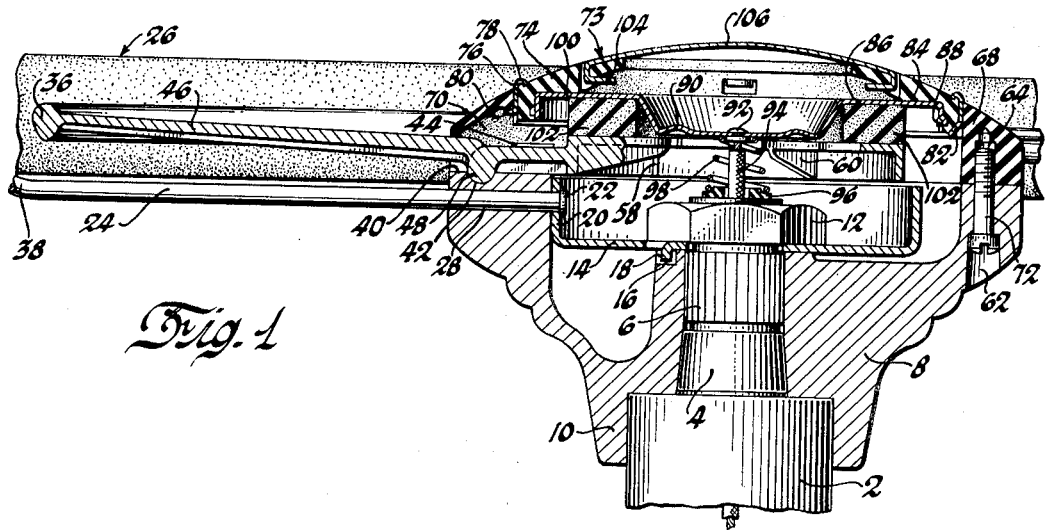
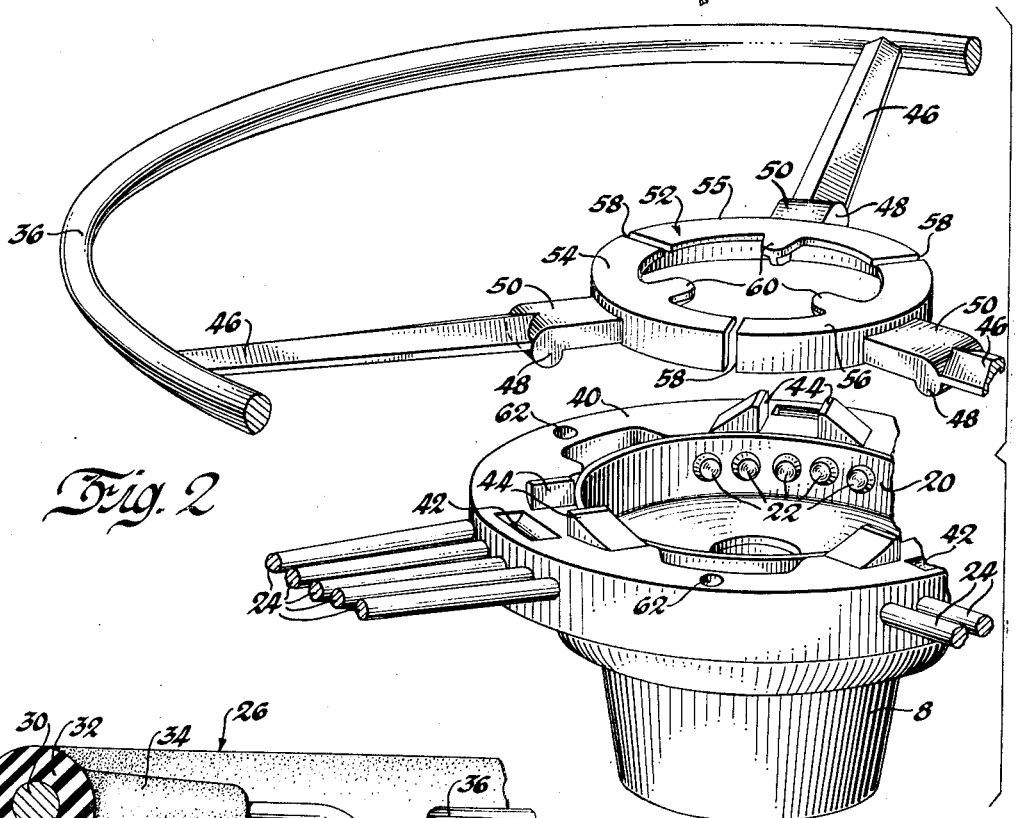
Inventors
Charles A. Chayne &
Edward F. Reynolds
Blackmore, Spencer & Hind
Attorneys March 12, 1940. C. A. CHAYNE ET AL 2,193,223

HORN BUTTON

Filed Sept. 18, 1937 2 Sheets-Sheet 2

Inventors
Charles A. Chayne &
Edward F. Reynolds
By
Blackmore, Spencer & Flint
Attorneys Patented Mar. 12, 1940

2,193,223

UNITED STATES PATENT OFFICE 2,193,223

HORN BUTTON

Charles A. Chayne and Edward F. Reynolds, Flint, Mich., assignors to General Motors Corporation, Detroit, Mich., a corporation of Delaware Application September 18, 1937, Serial No. 164,466

3 Claims. (Cl. 200—59)

This invention relates to horn buttons or horn sounders as applied to the steering wheel of an automobile.

In the past the usual horn sounder has been in the shape of a button mounted at the center of the wheel and by compressing the button a contact was made to complete the electric circuit through the sounding horn. To actuate the button it was necessary for the operator to move one hand from the steering wheel to depress the button. One of the objects of the invention is to make the operation of the horn button more convenient and to eliminate the necessity for the operator's removing his hand from the steering wheel. In the invention there has been mounted on the steering wheel hub a ring concentric with and enclosed within the steering wheel. This ring has spokes pivoted on the steering wheel hub and by compressing the ring the contact will be made to sound the horn. The ring may be operated merely by the driver placing his thumb or finger thereon and depressing it but not removing his hand from the steering wheel.

On the drawings:

Figure 1 is a cross sectional view through the hub of the steering wheel with the steering mast shown in full lines and showing the details of the invention.

Figure 2 is an expanded perspective view of the ring to operate the sounding horn and hub on which the ring is mounted.

Figure 3 is a sectional detail to show the manner in which the spokes of the steering wheel are depressed to house the horn sounding ring.

Figure 4:
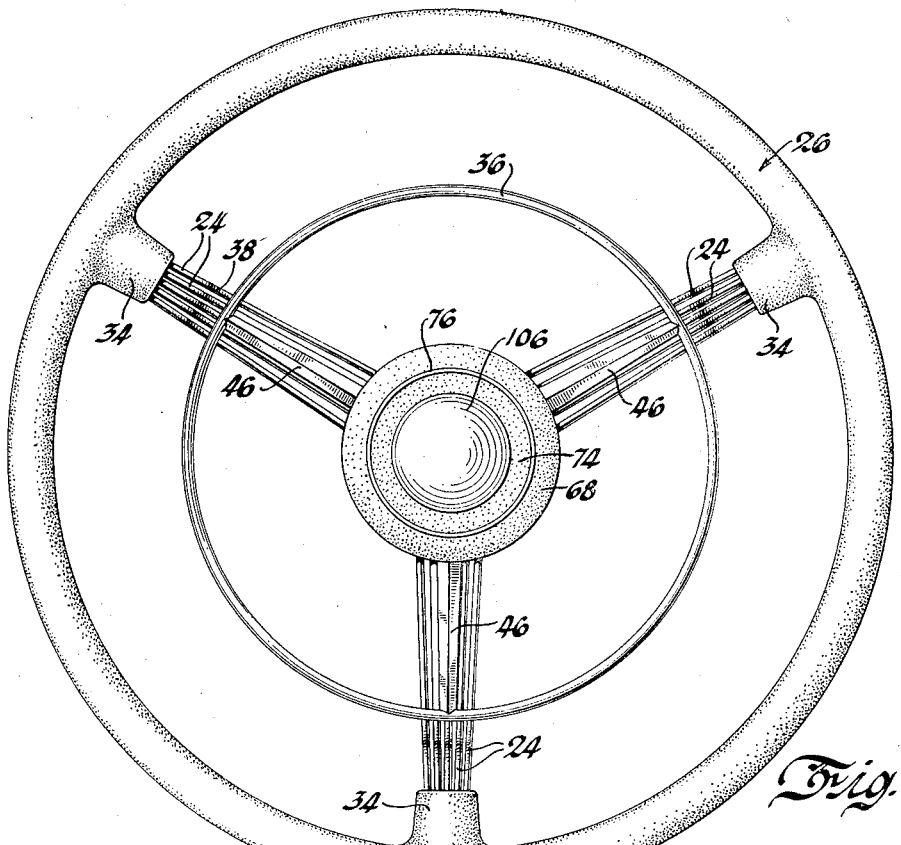
Figure 4 is a plan view of the steering wheel with the horn sounding ring applied.

On the drawings, the usual stationary steering mast is indicated at 2. The mast has housed therein the turnable steering tube, the upper tapered end of which is indicated at 4. The end of the tube 4 is serrated as at 6 and over the conical part 4 and the serrated part 6 there is received the hollow steering wheel hub 8 having an annular flange 10 which fits over the end of the steering mast 2. The hub 8 is made of metal, preferably of aluminum. The end of the steering tube 4 is screw threaded and receives the nut 12 rigidly to hold the hub 8 on the steering tube 4.

Between the nut 12 and the end of the tube 4 there is mounted the cup 14 having a downwardly depressed finger 16 which fits in a recess 18 in the end of the steering hub and serves to position the cup. To the side 20 of the cup there are secured the ends 22 of the spokes 24 of the steering wheel indicated as a whole at 26. The spokes 24 pass through the upper end of the hub 8 as indicated at 28 and extend outwardly to the wheel rim while the other ends are secured to the metal core 30 which is surrounded by the hard rubber covering 32. The rubber covering 32 extends inwardly of the wheel a short distance as shown at 34.

By referring to Figure 3 it will be noted that the spokes 24 are depressed, as indicated at 36, immediately beyond the part 34. The purpose of this depressed part is to allow the sounder ring 38 to be sunk deeper into the wheel.

Referring to Figure 2, it will be noted that the upper surface 40 of the hub 8 has the three recesses 42 near the outer edge thereof while near the inner edge there are the upwardly projecting lugs 44. The purpose of the recesses 42 and the lugs 44 is to receive the inner ends of the spokes 46 extending from the ring 38 to inside the hub 8. The spokes 46 have the rounded fulcrum part 48 projecting downwardly therefrom and beyond the part 48 the arms or spokes 46 have the rectangular section 50 which is received between the lugs 44 and serves to position the ring. An interior three-part ring 52 is integral with and interconnects the rectangular section 50 at the ends of the spokes. The ring 52 is right-angular in cross section and is split into three segments as indicated at 54, 55, and 56, the split being indicated at 58. Each section 54, 55, and 56 has a finger 60 which is in line with the spokes 46 and serves as a contact.

The hub 8 is provided with a suitable number of openings 62 which mate with screw threaded openings 64 in a cap 68 which fits over the hub. The cap 68 is made either of metal or hard rubber and is provided with suitable recesses 70 to accommodate the lugs 44, and machine screws 72 passing through the openings 62 and screw threaded into the openings 64 rigidly hold the cap 68 on the hub 8. The cap 68 has an opening therein in which there is received a horn sounding button indicated as a whole at 73. The button comprises the hard rubber ring 74 at the outer periphery of which there is the metal retaining ring 76. The ring 76 has its upper periphery inturned as shown at 78 to hold the ring 74 in place and at its bottom periphery has a plurality of outturned lugs 80 which engage under the metal cap 68. The retaining ring 76 is also provided with a plurality of inturned lugs 82 which engage the edge of the ring 74 inside the hub cap to interconnect the rings 74 and 76. The inside of the ring 74 has a shoulder 84 on which there is received the more or less cup-shaped element 86. The flanged edge of the cup-shaped element is provided with a plurality of outwardly pressed lugs 88 to engage in corresponding recesses in the ring 74, and a depressed part 90 at the center of the cup has secured thereto at 92 the contact wire 94 forming a part of the circuit of the horn button. An insulating washer 96 is mounted on the top of the steering tube 4, and a conical coil spring 98 is positioned between the washer 96 and the bottom of the depressed part 90 of the cup and constantly urges the cup 86 and the rings 74 and 76 in an upward direction and normally tends to hold them in the position shown in Figure 1.

Between the flat annular part 100 of the cup 86 and the upper surface of the ring sections 54, 55, and 56, there is positioned the soft rubber compressible ring 102.

The ring 74 is provided with a plurality of openings in which there are received the tongues 104 of the metal cap plate 106 which may bear the insignia of the automobile. If desired, the ring 74 may not have the insignia plate 106 and the opening for the finger 104 may be eliminated and the ring 74 formed in one piece to comprise both the ring 74 and the cap plate 106.

The operation of the structure of Figure 1 is as follows: the normal inoperative position of the parts is as shown in the figure. In case it is desired to sound the horn the operator may depress the ring 36 without taking his hand from the steering wheel. Depending upon the point at which the ring is depressed, one of the spokes 46 likewise will be depressed which will cause the spoke to shift on one of its pivot parts 48 and cause the corresponding segment 54, 55, or 56 to be tilted upwardly to cause the contact finger 60 to be engaged with the depressed part 90 of the cup 86 to complete the electrical circuit and sound the horn. In case the operator does not desire to use the ring and from habit depresses the button 73, the spring 98 and the soft rubber ring 102 will be compressed to allow the depressed part 90 to contact one of the fingers 60 to complete the circuit.

Figure 5:
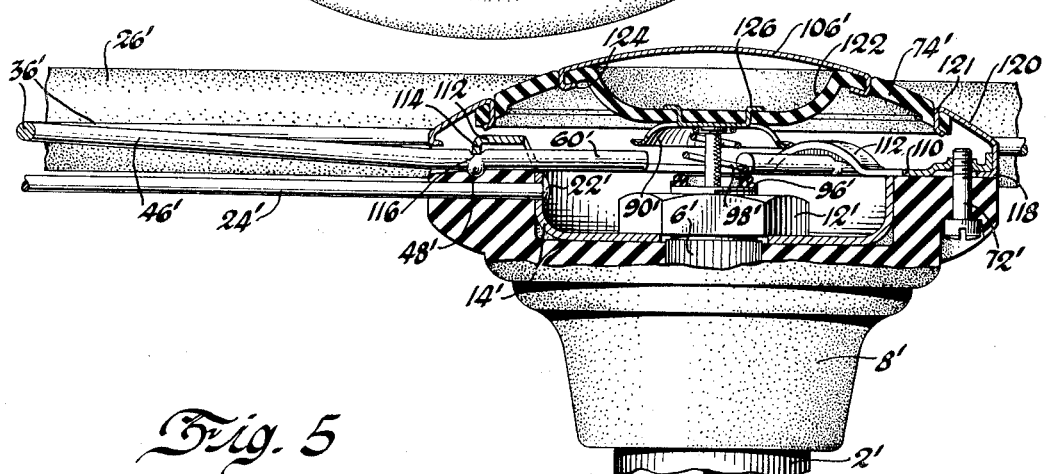
Figure 5 is a view similar to Figure 1 but showing a modification.

Referring to Figure 5, the corresponding parts of Figure 1 are indicated by the same numeral with a prime. The hub is likewise of metal and in general is of substantially the same configuration but different in the details as shown. In this species there is no inner ring section corresponding to the inner ring section 54, 55, and 56, but each spoke 46' of the ring 36' extends inwardly as indicated at 60' and is adapted to be swung upwardly on the pivot 48' to complete the contact through the contact ring 90'. Instead of the pivotal part 48 of the spokes 46 being held in place by lugs 44, the rubber ring 102 and button 73, a separate ring-like element 110 is provided. This element is provided with the upwardly extending parts 112 where it passes over the spoke ends 60' and is provided with the downturned flange 114 which rests in a recess 116 in the spoke immediately over the pivotal part 48'. The ring-like element 110 is held in place by means of the machine screws 72' which pass through threaded openings in the edge of the ring.

The ring-like element 110 also fits over an inturned annular flange 118 on an annulus 120. The annulus 120 has a plurality of fingers 121 which fit into openings in the edge of a second ring 74' which has a depressed part 122 at its middle. Over the depressed part there is secured the insignia cap 106' by means of the fingers 124 which pass through suitable openings in the element 74'.

The bottom of the depressed part 122 has the contact cup 90' secured thereto. The cup 90' is secured by means of the integral pressed-out fingers 126 which pass through corresponding openings in the depressed part 122 and are bent over as shown in the figure. In this species there is no button which corresponds to the button 73 and the horn may be sounded by depressing the ring 36' only. By depressing the ring 36' the spokes 46' will be moved on their pivots 48' to cause one of the ends 60' to strike the contact ring 90' to complete the circuit and sound the horn. If desired, the spokes 24' need not be depressed as shown at 38 in Figure 3 but they may be straight and extend in a straight line from their ends 22' to the wheel 26'.

We claim:

1. In a horn button sounder applied to the hub of the steering wheel of an automotive vehicle, a cover for said hub, a plurality of arms fulcrumed between the hub and cover, an outer ring interconnecting the outer ends of the arms, an inner ring at the inner ends of the arms, said outer ring adapted to move to shift the arms on their fulcrums to move the inner ring, a horn button movably mounted in the cover, an electrical contact on the button, said inner ring adapted to be moved into engagement with the contact and said contact adapted to be moved into engagement with the inner ring, the engagement of said ring and contact completing the electrical circuit to cause the horn to be sounded.

2. In a horn button sounder applied to the hub of the steering wheel of an automotive vehicle, a cover for said hub, a plurality of arms fulcrumed between the hub and cover, an outer ring interconnecting the outer ends of the arms, an inner ring at the inner ends of the arms, fingers projecting from the inner ring, said outer ring adapted to move to shift the arms on their fulcrums to move the inner ring, a horn button movably mounted in the cover, an electrical contact on the button, said inner ring adapted to be moved to cause the fingers to move into egagement with the contact and said contact adapted to be moved into engagement with the fingers, the engagement of said fingers with the contact completing the electrical circuit to cause the horn to be sounded.

3. In a horn sounder applied to the hub of the steering wheel of an automotive vehicle, a cap for the hub, a plurality of arms extending between the hub and cap, means on the hub to fulcrum the arms, means on the hub to guide the arms, an outer ring interconnecting the arm ends, an inner ring at the inner ends of the arms, a horn button slidably mounted in the cap, an electrical contact on the button, said contact adapted to be engaged by the inner ring when the outer ring is moved to move the arms on their fulcrums, said button adapted to be moved to cause the contact to engage with the inner ring, the engagement of said ring and contact completing the electric circuit to cause the horn to be sounded.

CHARLES A. CHAYNE.
EDWARD F. REYNOLDS.